April 19, 1960

C. CLARK, JR 2,933,683

PHASE CONTROLLED MEASURING SYSTEM

Filed Nov. 14, 1957

INVENTOR.
CHARLES CLARK Jr.
BY
ATTORNEYS

April 19, 1960  C. CLARK, JR  2,933,683
PHASE CONTROLLED MEASURING SYSTEM
Filed Nov. 14, 1957  3 Sheets-Sheet 3

INVENTOR.
CHARLES CLARK Jr.
BY
ATTORNEYS

United States Patent Office 2,933,683
Patented Apr. 19, 1960

2,933,683

PHASE CONTROLLED MEASURING SYSTEM

Charles Clark, Jr., Baltimore, Md., assignor, by mesne assignments, to the United States of America as represented by the Secretary of the Air Force Application November 14, 1957, Serial No. 696,575

6 Claims. (Cl. 324—83)

This invention relates to a measuring system and more particularly to a system which automatically and continuously measures the jitter present in an electronic system that employs an oscillator that is phase locked by an injected locking pulse.

Jitter from a locked oscillator comes from two main causes: one, improper oscillator locking and two, "short time" oscillator frequency drift. When a locked oscillator such as a coherent oscillator is incorporated in a system such as MTI, the jitter of the coherent oscillator imposes a limitation on the effectiveness of the MTI system. The jitter factor is very important to the accuracy of operation, consequently, it is highly desirable to utilize an automatic jitter measuring apparatus which may be integrated with the MTI system.

An object of the present invention is to provide a system to measure the amount of jitter existing in a phase locked oscillator.

A further object of my invention is to provide a system capable of time jitter measurements in the order of .2 millimicrosecond.

A still further object of my invention is to provide a system to automatically and continuously measure jitter present in a phase locked oscillator.

Still further objects and advantages of the present invention will appear from the more detailed description set forth below, it being understood, however, that a more detailed description is given by way of illustration and exploration only, and not by way of limitation, since various changes therein may be made by those skilled in the art without departing from the scope and spirit of the present invention.

Figure 1:
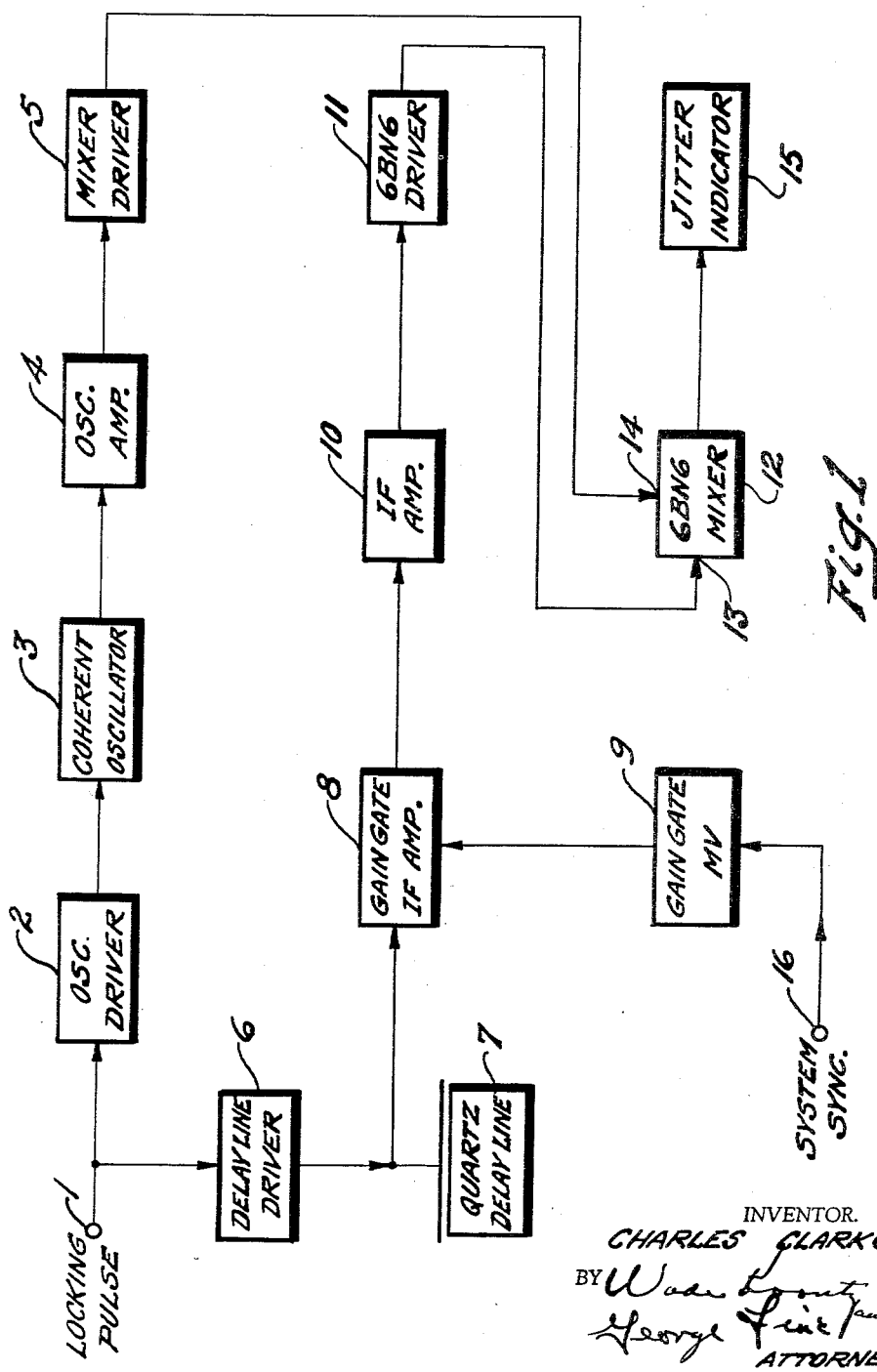
Fig. 1 is a block diagram of a system for automatically measuring jitter present in a phase locked oscillator.

In a preferred embodiment of the present invention, terminal 1 is adapted to receive a locking pulse (such as utilized in an MTI system) which is then simultaneously fed into oscillaltor driver 2 and delay line driver 6. Delay line driver 6 amplifies the locking pulse so that the locking pulse that is coupled to signal generator unit 7 in the form of a quartz reflecting delay line is large enough to cause upward of 30 to 60, 30 megacycle pulses, depending on the delay time (time between pulses). Quartz delay line 7 is a conventional supersonic ringing delay line except that it has only a single transducer. The pulse applied will reflect up and down the quartz as long as there is sufficient energy left in the pulse. The quartz is of very low loss material; however, the transducer produces a considerable loss. Normally, all of these pulses would be of different amplitudes, so to overcome the different amplitude levels of the 30 to 60 pulses that are generated from the amplified locking pulse being applied to quartz delay line 7, I.F. amplifier 8 following quartz delay line 7 is gain-gated. Amplifier 8 is gated, by synchronized multivibrator 9, so that all the pulses have the same amplitude at the output of gain-gated I.F. amplifier 8. Multivibrator 9 receives its synchronizing signal from terminal 16. The synchronizing signal is supplied by the MTI system of which coherent oscillator 3 is a part. The synchronizing signal is related in time to aforementioned locking pulse. I.F. amplifiers 10 and 6BN6 driver 11 are utilized following gain-gated amplifier 8 to cause all of the pulses to be at a high signal level at the input 13 of mixer 12. Mixer 12 may be a beam type vacuum tube such as a 6BN6.

The locking pulse which was fed to oscillator driver 2 is amplified therein and injected into coherent oscillator 3 to cause phase locking. The high frequency C.W. signal from coherent oscillator 3 is fed into amplifier 4 and then the amplified C.W. is fed into mixer driver 5. The CW output of mixer driver 5 is fed into input 14 of mixer 12.

Figure 2:
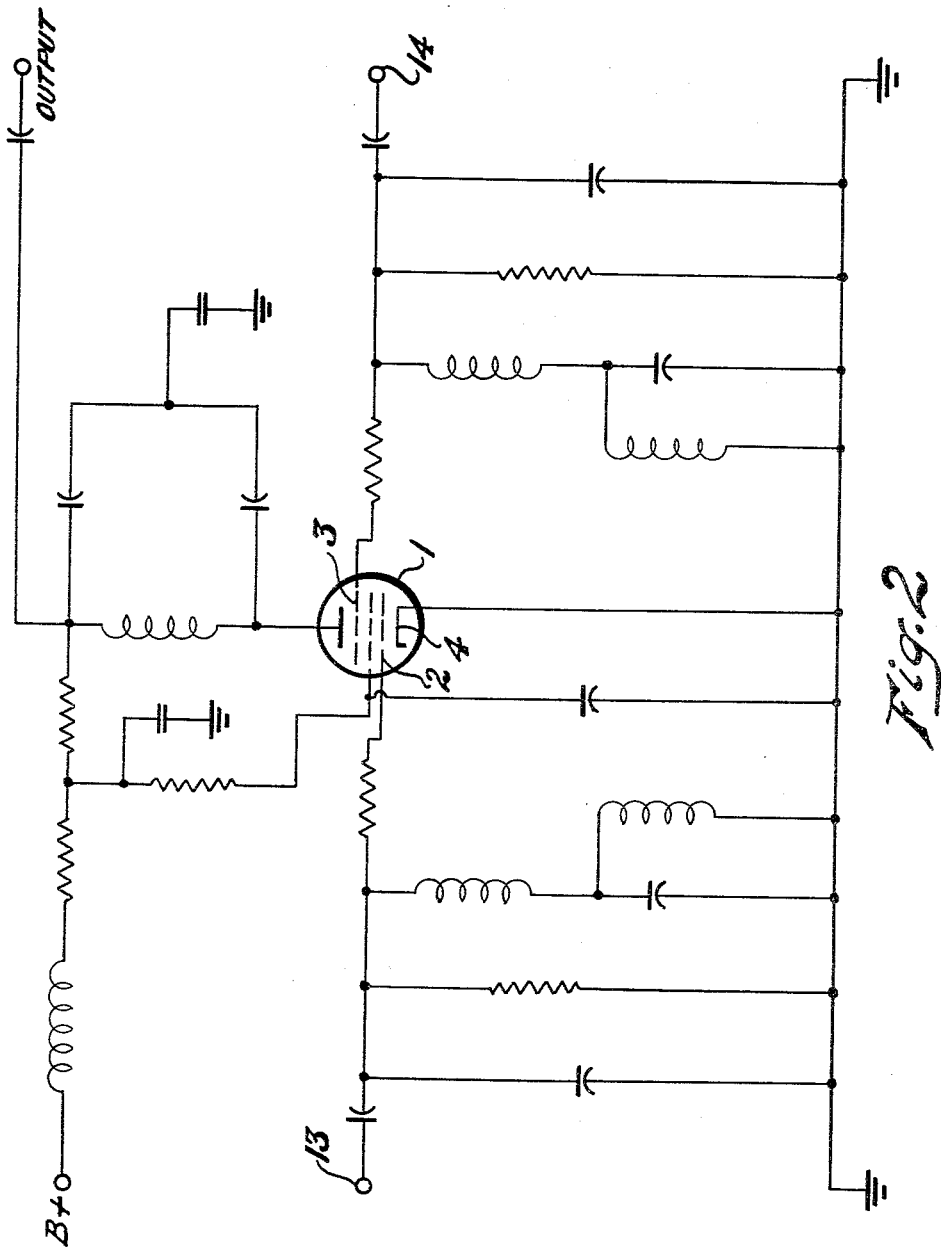
Fig. 2 shows a 6BN6 mixer and $\phi$ detector including its associated circuitry.

The circuitry for 6BN6 mixer 12 of Fig. 1 is shown in Fig. 2. Input 13 of Fig. 1 is shown as input 13 of Fig. 2 and is adapted to receive amplified signals of 30 to 60 pulses. Input 14 of Fig. 1 is shown as input 14 of Fig. 2 and is adapted to receive an amplified C.W. signal. Vacuum tube 1 utilized in the mixer is a tube such as the 6BN6 type.

The train of pulses entering input 13 and the C.W. signal at input 14 are at a high signal level at control grids of vacuum tube 1 in order to cause "sharp switching" of the said tube since it is essentially a high speed electronic switch.

Figure 3:
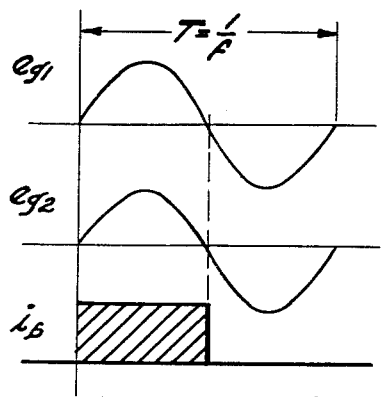
Fig. 3 shows curves of current flow in the 6BN6 mixer.

The mixer operates in the following way: the two signals (1) the 30–60 pulses and, (2) the amplified oscillator C.W. are coupled to vacuum tube 1 at two separate grids, 2 and 3 respectively. The grids of any electronic tube are the controlling elements; consequently, these two grids of vacuum tube 1 are the controlling elements; vacuum tube 1 will not conduct (pass current) unless there is a signal present on both grids simultaneously; hence, the two grids act as two series connected controlling switches. That is, both must be on to allow vacuum tube 1 to conduct. However, the frequency of each signal—the pulses and oscillator C.W.—is the same because both use the same source frequency—the locking pulse; thus when both grids of vacuum tube 1 contain a signal simultaneously, tube 1 will be switched on and current flow will be a maximum as shown in Fig. 3.

Figure 4:
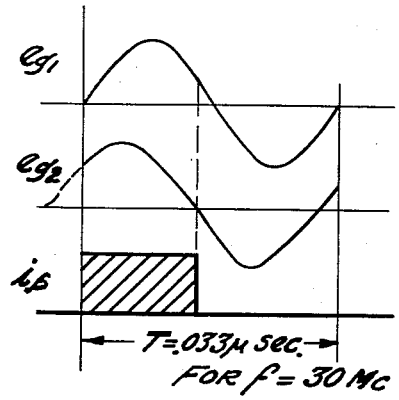
Figs. 4 and 5 show curves illustrating the effect of phase shift upon current flow in the 6BN6 mixer.
Figure 5:
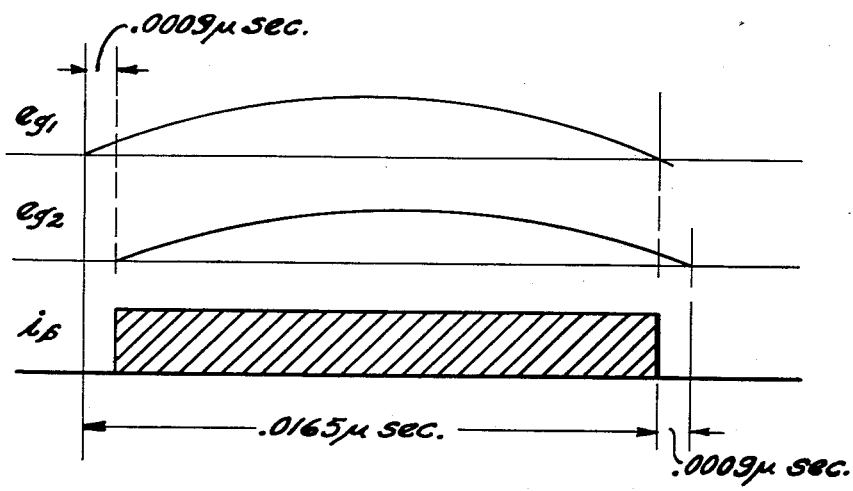

The circuitry for vacuum tube 1 is so designed that conduction results in the positive half cycles—cathode 4 of tube 1 is connected to ground. From Fig. 3 it is seen that if one of the cycles is displaced in time from the other the current flowing through vacuum tube 1 will be less than as illustrated which represents both signals in phase. By examining Figs. 4 and 5, it may be seen that a phase shift of only 10° or a time displacement of 0.00093 microsecond—using a 30 megacycle signal—results in an 11% change of current per cycle. This 11% change of current can easily be indicated by a metering circuit designed to record the output from vacuum tube 1.

From the preceding paragraph, it is apparent that no ordinary circuit can differentiate 0.93 millimicrosecond. Now, the circuit is designed to check the jitter of coherent oscillator—which can result from two causes. One is improper phase locking of the oscillator under observation and the other is frequency drift of the oscillator.

Now again referring to Fig. 1, if the oscillations of coherent oscillator 3 are not phase locked, because of too weak locking pulse or a high distorted (pulse full of harmonics and/or poor leading edge) locking pulse, the oscillations of coherent oscillator 3 will not be in phase with the oscillations of the pulse; consequently, the current through 6BN6 mixer 12 will not be at a maximum but some value less than maximum. Because of the high frequency stability required and used in coherent oscillator 3, the phase difference between the two signals will be constant and the current flow through 6BN6 mixer 12 will be a constant value less than maximum. If the frequency of coherent oscillator 3 drifts, the frequency drift will cause a varying phase shift from cycle to cycle; thus, the current flow through 6BN6 mixer 12 will vary.

The metering circuit of the present invention is so arranged that, normally, jitter indicator 15, which may be a microammeter indicates 6BN6 mixer 12 current flow represented by any improper phase locking and coherent oscillator frequency drift. However, the face of jitter indicator 15 is calibrated such that certain meter current indicates oscillator jitter trouble. As stated before, maximum 6BN6 mixer current indicates phase coherence and any value less than maximum indicates oscillator jitter; thus the face of jitter indicator 15 would have to be calibrated for the particular system and oscillator tested (i.e., oscillator allowable frequency drift and ability to phase lock differ, consequently, excessive jitter of one oscillator would not necessarily mean the same amount of jitter would be excessive for another oscillator). Jitter indicator 15 may be calibrated in any convenient scale or system that indicates whether the jitter is acceptable on the borderline, or not acceptable.

What is claimed is:

1. Means for determining the presence or absence of jitter in a phase locking communication system comprising, in combination, a C.W. signal generator and a quartz delay line, means for applying a common phase locking pulse to both said signal generator and said quartz delay line, to control their operation, said quartz delay line producing a train of pulsed C.W. signals upon application of each of said locking pulse thereto, and said C.W. signal generator producing a phase-locked C.W. signal, said train of pulsed C.W. signals being utilized as a reference signal, means to gain gate said train of pulses, said gating means being solely responsive to an external source of synchronizing signal and means to measure the degree in phase, if any, by which said phase-locked C.W. signal deviates from said gain gated pulsed C.W. signal, said last-named means including a beam type electron discharge device for receiving said phase-locked C.W. signal and said gain gated pulsed C.W. signal, and meter means to measure the output of said beam type electron discharge device and thereby determine the presence or absence of jitter as reflected in the reaction of said beam type electron discharge device to said last two-named signals applied thereto.

2. Means for determining the presence or absence of jitter in a phase locking communication system comprising, in combination, a continuous wave signal generator and a quartz reflecting delay line, said quartz reflecting delay line operating as a pulse generator, means for applying a common phase locking pulse from an external source to said continuous wave signal generator and said quartz reflecting delay line, to control their operation, said quartz reflecting delay line producing a train of pulsed C.W. signals upon application of each of said locking pulses thereto, and said continuous wave signal generator producing a phase-locked C.W. signal, said train of pulsed C.W. signals being utilized as a reference signal, means for gain gating said train of pulsed C.W. signals, said gating means being solely responsive to an external source operating to supply synchronizing signals means to measure the degree in phase, if any, by which said phase locked C.W. signal deviates from said pulsed C.W. signal, said last-named means including a beam type electron discharge device for receiving the said phased locked C.W. signal and said train of pulsed C.W. signals, and means responsive to said phase locked C.W. signal and said train of pulsed C.W. signals to sharply switch said beam type electron discharge device to a conducting state, the variation in magnitude of said conduction determining the magnitude of said jitter.

3. A system for automatically measuring jitter in a phase locked oscillator comprising an oscillator and a ringing quartz delay line both receiving a common locking pulse, said locking pulse utilized to phase lock said oscillator and simultaneously generate a train of pulsed C.W. signals from said quartz delay line for each of said locking pulses, circuitry including a beam type electron discharge device receiving dual inputs, one a C.W. signal from said phase locked oscillator and the other being said train of pulse C.W. signals from said quartz delay line, and meter means to measure the output of said beam type electron discharge device and thereby determine the presence or absence of jitter as reflected in the reaction of said beam type electron discharge device to said two signals.

4. A system for automatically measuring jitter in a phase locked oscillator comprising a sine wave signal generator adapted to being phase locked, a quartz reflecting delay line operating as a C.W. pulse generator, means for applying to said sine wave generator and said quartz reflecting delay line a common phase locking pulse derived from an external source, to control their operation, said sine wave generator producing a phase-locked sine wave signal, said quartz reflecting delay line producing a train of C.W. pulses for each of said phase locking pulses, means to gain-gate said train of C.W. pulses, said gain-gating means being solely responsive to an external source of synchronizing signal, means including a beam type electron discharge device, said beam type electron discharge device having said last two-named signals applied thereto, and means to measure the output of said beam type electron discharge device to determine the presence or absence of jitter as reflected in the reaction of said beam type electron discharge device to said last two-named signals to establish each of said gain-gated train of C.W. pulses as a reference signal for said phase-locked sine wave signal.

5. A system for automatically measuring jitter in a phase-locked oscillator comprising a sine wave signal generator adapted to be phase-locked, a quartz reflecting delay line operating as a C.W. pulse generator, means for applying to said sine wave generator and said quartz reflecting delay line a common phase locking pulse derived from an external source, to control their operation, said sine wave oscillator producing a phase-locked sine wave signal, said quartz reflecting delay line producing a train of C.W. pulses for each of said phase-locking pulses, means to gain-gate said train of C.W. pulses, said gain-gating means being solely responsive to an external source of synchronizing signal, means to separately amplify said phase-locked sine wave signals and said gain-gated train of C.W. pulses, a beam type electron discharge device having first and second control grids, an anode, and a cathode, means to apply said amplified phase-locked sine wave signal to said first control grid, means to apply said amplified train of C.W. pulses to said second control grid, and means to drive said electron discharge device to maximum conduction when said applied signals are in phase with each other.

6. In a system for automatically measuring jitter in a phase-locked sine wave oscillator comprising means to phase-lock said sine wave oscillator, means to generate a series of C.W. pulses of the same frequency and phase as said sine wave oscillator, said sine wave oscillator and said C.W. pulse generator receiving a common phase-locking pulse, means to control said train of pulses to produce equal amplitudes in all of said pulses, a beam type electron discharge device having cathode, anode, first and second control grids, said first control grid being impressed with said train of equal amplitude C.W. pulses, said second control grid being impressed with said phase-locked sine wave signal, and means to generate a maximum output signal from said anode during periods said impressed voltages are in phase with each other, said output signal varying from maximum to a lower magnitude when said impressed signals vary in phase.

References Cited in the file of this patent

UNITED STATES PATENTS

| | | |
|---|---|---|
| 2,223,840 | Wolff | Dec. 3, 1940 |
| 2,484,352 | Miller et al. | Oct. 11, 1949 |
| 2,789,267 | Beal et al. | Apr. 16, 1957 |